US011026056B2

United States Patent
Åkesson et al.

(10) Patent No.: US 11,026,056 B2
(45) Date of Patent: Jun. 1, 2021

(54) MBMS BEARER HANDLING

(71) Applicant: TELEFONAKTIEBOLAGET LM ERICSSON (PUBL), Stockholm (SE)

(72) Inventors: Joakim Åkesson, Landvetter (SE); Magnus Tränk, Lerum (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 898 days.

(21) Appl. No.: 14/906,982

(22) PCT Filed: Jan. 15, 2016

(86) PCT No.: PCT/EP2016/050843
§ 371 (c)(1),
(2) Date: Jan. 22, 2016

(87) PCT Pub. No.: WO2017/121492
PCT Pub. Date: Jul. 20, 2017

(65) Prior Publication Data
US 2017/0245117 A1  Aug. 24, 2017

(51) Int. Cl.
*H04W 4/06* (2009.01)
*H04L 12/18* (2006.01)
*H04W 76/10* (2018.01)

(52) U.S. Cl.
CPC ............. *H04W 4/06* (2013.01); *H04L 12/189* (2013.01); *H04W 76/10* (2018.02)

(58) Field of Classification Search
None
See application file for complete search history.

(56) References Cited

U.S. PATENT DOCUMENTS

2012/0170501 A1*  7/2012  Drozt ............... H04W 72/005
                                                 370/312
2013/0064160 A1*  3/2013  Newberg ........... H04W 76/002
                                                 370/312

(Continued)

FOREIGN PATENT DOCUMENTS

RU   2004126154 A    1/2006
WO   2009097818 A1   8/2009
WO   2013102036 A1   7/2013

OTHER PUBLICATIONS

Universal Mobile Telecommunications System (UMTS); LTE; Multimedia Broadcast/Multicast Service (MBMS); Architecture and functional description (3GPP TS 23.246 version 12.6.0 Release 12)Technical Specification. European Telecommunications Standards Institute (ETSI). 650. Route Des Lucioles ; F-06921 Sophia-Antipolis ; France. vol. 3GPP SA 2. No. V12.6.0. Oct. 1, 2015 (Oct. 1, 2015).

(Continued)

*Primary Examiner* — Hassan Kizou
*Assistant Examiner* — Hector Reyes (57) ABSTRACT

There is provided mechanisms for multimedia broadcast multicast service (MBMS) bearer handling in a group communications system. A method is performed by a control node. The method comprises obtaining a need for a new MBMS bearer to be activated. The method comprises activating the new MBMS bearer. The method comprises announcing MBMS bearer identity and complementary service announcement information of the new MBMS bearer on an already announced MBMS bearer, thereby announcing the new MBMS bearer.

16 Claims, 5 Drawing Sheets

(56) References Cited

U.S. PATENT DOCUMENTS

2013/0136049 A1* 5/2013 Song .................. H04W 76/002
    370/312
2016/0119762 A1* 4/2016 Zhu ........................ H04W 4/10
    370/312

OTHER PUBLICATIONS

Universal Mobile Telecommunications System (UMTS); LTE; Multimedia Broadcast/Multicast Service (MBMS); Protocols and codecs (3GPP TS 26.346 version 12.7.0 Release 12). Technical Specification. European Telecommunications Standards Institute (ETSI). 650. Route Des Lucioles ; F-06921 Sophia-Antipolis ; France. vol. 3GPP SA 4. No. V12.7.0. Oct. 1, 2015 (Oct. 1, 2015).
3rd Generation Partnership Project; Technical Specification Group Services and System Aspects; Multimedia Broadcast/Multicast Service (MBMS); Architecture and functional description (Release 13) 3GPP TS 23.246 V13.2.0 (Sep. 2015).
3rd Generation Partnership Project; Technical Specification Group Services and System Aspects; Multimedia Broadcast/Multicast Service (MBMS); Protocols and codecs (Release 13). 3GPP TS 26.346 V13.2.0 (Sep. 2015).
3rd Generation Partnership Project; Technical Specification Group Services and System Aspects; Group Communication System Enablers for LTE (GCSE_LTE); Stage 2 (Release 13). 3GPP TS 23.468 V13.2.0 (Sep. 2015).
3rd Generation Partnership Project; Technical Specification Group Services and System Aspects; Functional architecture and information flows to support mission critical communication services; Stage 2 (Release 13). 3GPP TS 23.179 V1.1.1 (Oct. 2015).
Ericsson, New study item on MBMS for mission critical communication services, S6-151453 (revision of S6-151328) 3GPP TSG-SA WGG6 Meeting #8, Anaheim, USA, Nov. 16-20, 2015.

* cited by examiner

MBMS BEARER HANDLING

TECHNICAL FIELD

Embodiments presented herein relate to multimedia broadcast multicast service (MBMS) bearer handling, and particularly to methods, a control node, a client node, computer programs, and a computer program product for MBMS bearer handling in a group communications system.

BACKGROUND

In communications networks, there may be a challenge to obtain good performance and capacity for a given communications protocol, its parameters and the physical environment in which the communications network is deployed.

An example of applications available in some communications system is group communications services. In general terms, group communication means that the same information or media is delivered to multiple client nodes. In group communication systems (e.g., Push-To-Talk (PTT) systems) the client nodes receiving the same media constitute a group of client nodes. These client nodes may be located at different locations. If many client nodes are located within the same area, multicast or broadcast based transmission using e.g., Multicast-Broadcast Multimedia Services (MBMS) is efficient for communications to the group of client nodes, because communications resources such as time and frequency resources are shared among client nodes. If client nodes are spread out over a large geographical area it can be more efficient to use unicast transmission for communications to the group of client nodes.

Before using MBMS there are two different activities that currently must be performed.

Firstly, an MBMS bearer must be activated. This will enable media to be sent over the network and be broadcasted to wireless devices hosting the client nodes. In a 3rd Generation Partnership Project (3GPP) Long Term evolution (LTE) network this is initiated in a Broadcast Multicast Service Center (BMSC) as defined in 3GPP TS 23.246 v13.2.0.

Secondly, the client nodes must be informed of the service being broadcasted over the MBMS bearer. This is required so that the client nodes know how to receive the media over the MBMS bearer. This procedure is commonly known as a service announcement procedure and is defined in 3GPP TS 26.346 v13.2.0.

The information sent in the service announcement message includes several aspects of the service that shall be broadcasted. For example, it includes a reference to the MBMS bearer, it includes Internet protocol (IP) address, ports, protocols and codecs used to receive the media that shall broadcasted. This type of information is currently essential in order for the client node to, via its hosting wireless device, receive anything on the MBMS bearer, and is therefore currently mandatory. Furthermore, the service announcement may contain several other type of information, such as service area, scheduling information, reception reporting procedures, error correction information, etc.

When using MBMS for group communication both of the above mandatory activities must be performed before a group call over MBMS may start. The reason for this is that, at least currently, both bearer activation and service announcement is too time consuming to be performed at the start of the group call.

The service announcement procedures currently used are either interactive (meaning that the client nodes request the information or a control node of the group communications service pushes the information to the client nodes) or repetitive, for example by on regular interval broadcast the information on a known broadcast bearer, which the wireless device may monitor on a regular basis.

Due to the group communications dynamic need for MBMS capacity, and the time consuming provisioning process (which includes both the activation of the MBMS bearer as well as the service announcement process), it can be difficult to efficiently use the MBMS capacity for a group communication system such as a PTT system.

Hence, there is a need for mechanisms that enable efficient use of MBMS capacity in a group communications system.

SUMMARY

An object of embodiments herein is to provide efficient use of MBMS capacity in a group communications system.

According to a first aspect there is presented a method for multimedia broadcast multicast service (MBMS) bearer handling in a group communications system. The method is performed by a control node. The method comprises obtaining a need for a new MBMS bearer to be activated. The method comprises activating the new MBMS bearer. The method comprises announcing MBMS bearer identity and complementary service announcement information of the new MBMS bearer on an already announced MBMS bearer, thereby announcing the new MBMS bearer.

Advantageously this method provides efficient MBMS bearer handling in the group communications system.

According to a second aspect there is presented a control node for MBMS bearer handling in a group communications system. The control node comprises processing circuitry. The processing circuitry is configured to cause the control node to obtain a need for a new MBMS bearer to be activated. The processing circuitry is configured to cause the control node to activate the new MBMS bearer. The processing circuitry is configured to cause the control node to announce MBMS bearer identity and complementary service announcement information of the new MBMS bearer on an already announced MBMS bearer, thereby announcing the new MBMS bearer.

Advantageously this control node provides efficient MBMS bearer handling in the group communications system.

According to a third aspect there is presented a control node for MBMS bearer handling in a group communications system. The control node comprises processing circuitry and a computer program product. The computer program product stores instructions that, when executed by the processing circuitry, causes the control node to perform a set of operations, or steps. The operations, or steps, involve obtaining a need for a new MBMS bearer to be activated. The operations, or steps, involve activating the new MBMS bearer. The operations, or steps, involve announcing MBMS bearer identity and complementary service announcement information of the new MBMS bearer on an already announced MBMS bearer, thereby announcing the new MBMS bearer.

Advantageously this control node provides efficient MBMS bearer handling in the group communications system.

According to a fourth aspect there is presented a control node for MBMS bearer handling in a group communications system. The control node comprises an obtain module configured to obtain a need for a new MBMS bearer to be activated. The control node comprises an activate module configured to activate the new MBMS bearer. The control node comprises an announce module configured to announce MBMS bearer identity and complementary service announcement information of the new MBMS bearer on an already announced MBMS bearer, thereby announcing the new MBMS bearer.

Advantageously this control node provides efficient MBMS bearer handling in the group communications system.

According to a fifth aspect there is presented a computer program for MBMS bearer handling in a group communications system, the computer program comprising computer program code which, when run on processing circuitry of a control node, causes the control node to perform a method according to the first aspect.

Advantageously this computer program provides efficient MBMS bearer handling in the group communications system.

According to a sixth aspect there is presented a method for multimedia broadcast multicast service (MBMS) bearer handling in a group communications system. The method is performed by a client node. The method comprises obtaining a broadcast service announcement of a new MBMS bearer on an already announced MBMS bearer from a control node of the group communications system. The service announcement comprises the MBMS bearer identity and complementary service announcement information of the new MBMS bearer.

Advantageously this method provides efficient MBMS bearer handling in the group communications system.

According to a seventh aspect there is presented a client node for MBMS bearer handling in a group communications system. The client node comprises processing circuitry. The processing circuitry is configured to cause the client node to obtain a broadcast service announcement of a new MBMS bearer on an already announced MBMS bearer from a control node of the group communications system. The service announcement comprises the MBMS bearer identity and complementary service announcement information of the new MBMS bearer.

Advantageously this client node provides efficient MBMS bearer handling in the group communications system.

According to an eighth aspect there is presented a client node for MBMS bearer handling in a group communications system. The client node comprises processing circuitry and a computer program product. The computer program product storing instructions that, when executed by the processing circuitry, causes the client node to obtain a broadcast service announcement of a new MBMS bearer on an already announced MBMS bearer from a control node of the group communications system. The service announcement comprises the MBMS bearer identity and complementary service announcement information of the new MBMS bearer.

Advantageously this client node provides efficient MBMS bearer handling in the group communications system.

According to a ninth aspect there is presented a client node for MBMS bearer handling in a group communications system. The client node comprises an obtain module configured to obtain a broadcast service announcement of a new MBMS bearer on an already announced MBMS bearer from a control node of the group communications system. The service announcement comprises the MBMS bearer identity and complementary service announcement information of the new MBMS bearer.

Advantageously this client node provides efficient MBMS bearer handling in the group communications system.

According to a tenth aspect there is presented a computer program for MBMS bearer handling in a group communications system, the computer program comprising computer program code which, when run on processing circuitry of a client node, causes the client node to perform a method according to the sixth aspect.

Advantageously this computer program provides efficient MBMS bearer handling in the group communications system.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously this computer program product provides efficient MBMS bearer handling in the group communications system.

Further advantageously, these methods, these control nodes, these client nodes, and these computer programs in turn enable efficient use of MBMS capacity in the group communications system.

Further advantageously, these methods, these control nodes, these client nodes, and these computer programs provide a time efficient service announcement process. This time efficient service announcement process enables the group communication system to utilize the MBMS resources dynamically and to on demand adjust services and add new services over MBMS.

Further advantageously, these methods, these control nodes, these client nodes, and these computer programs allow the client nodes to stay in idle mode and still receive service announcement information in real time.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
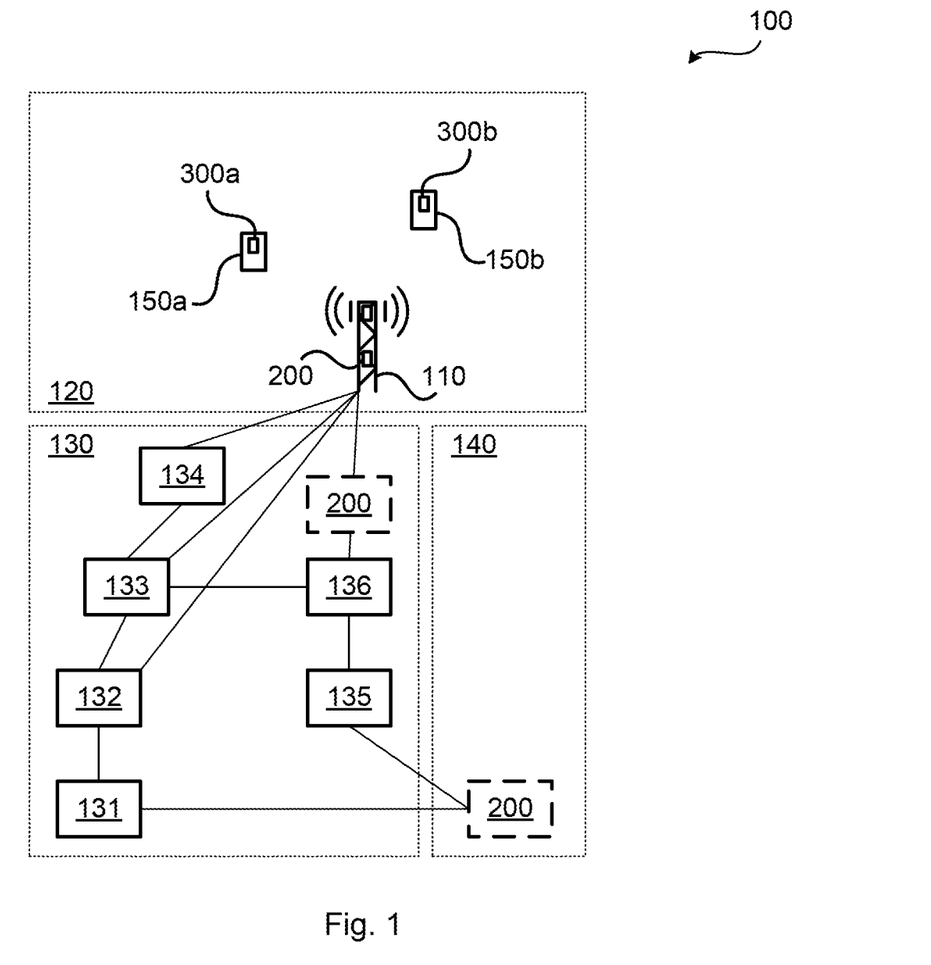
FIG. 1 is a schematic diagram illustrating a communications system according to embodiments.

FIG. 1 is a schematic diagram illustrating a communications system 100 where embodiments presented herein can be applied. The communications system 100 is assumed to provide services for group communication and may hence be regarded as a group communications system. The group communications system 100 is, according to some aspects, a push to talk (PTT) system.

The communications system 100 comprises a radio access network 120, a core network 130, and a service network 140. Particularly, the core network 130 comprises a packet data network gateway (PGW) 131, a serving gateway (SGW) 132, a mobility management entity (MME) 133, a multicell coordination entity (MCE) 134, a broadcast multicast service centre (BM-SC) 135, and an MBMS gateway (MBMS GW) 136. The PGW 131, SGW 132, MME 133, MCE 134, BM-SC 135, and MBMS GW 136 perform functionalities as known in the art and further description thereof is therefore omitted.

The communications system 100 further comprises at least one control node 200 and at least one client node 300a, 300b. The at least one control node 200 may be provided in, or installed on, a radio access network node 110 or in another entity or device in the radio access network 120, in an entity or device of the core network 130, or in an entity or device of the service network 140. The at least one control node 200 could implement the functionality of a group communication application server (GCS AS). Each client node 300a, 300b may be provided in, or installed on, a respective wireless device 150a, 150b. The radio access network 120 is operatively connected to the core network 130 which in turn is operatively connected to the service network 140. The radio access network node 110 thereby enables the wireless devices 150a, 150b, and hence the client nodes 300a, 300b, to access services and exchange data as provided by the service network 140.

Examples of wireless devices 150a, 150b include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, and access points. As the skilled person understands, the communications system 100 may comprise a plurality of radio access network nodes 110, each providing network access to a plurality of wireless devices 150a, 150b. The herein disclosed embodiments are not limited to any particular number of radio access network nodes 110, client nodes 300a, 300b, or wireless devices 150a, 150b.

As disclosed above, due to the group communications dynamic need for MBMS capacity, and the time consuming provisioning process, it can be difficult to efficiently use the MBMS capacity for a group communication system such as a PTT system. Furthermore, to perform an interactive service announcement would require that the wireless devices 150a, 150b hosting the client nodes 150a, 150b becomes operatively connected to the radio access network 110 (by being in radio resource control connected (RRC_CONNECTED) mode).

Figure 8:
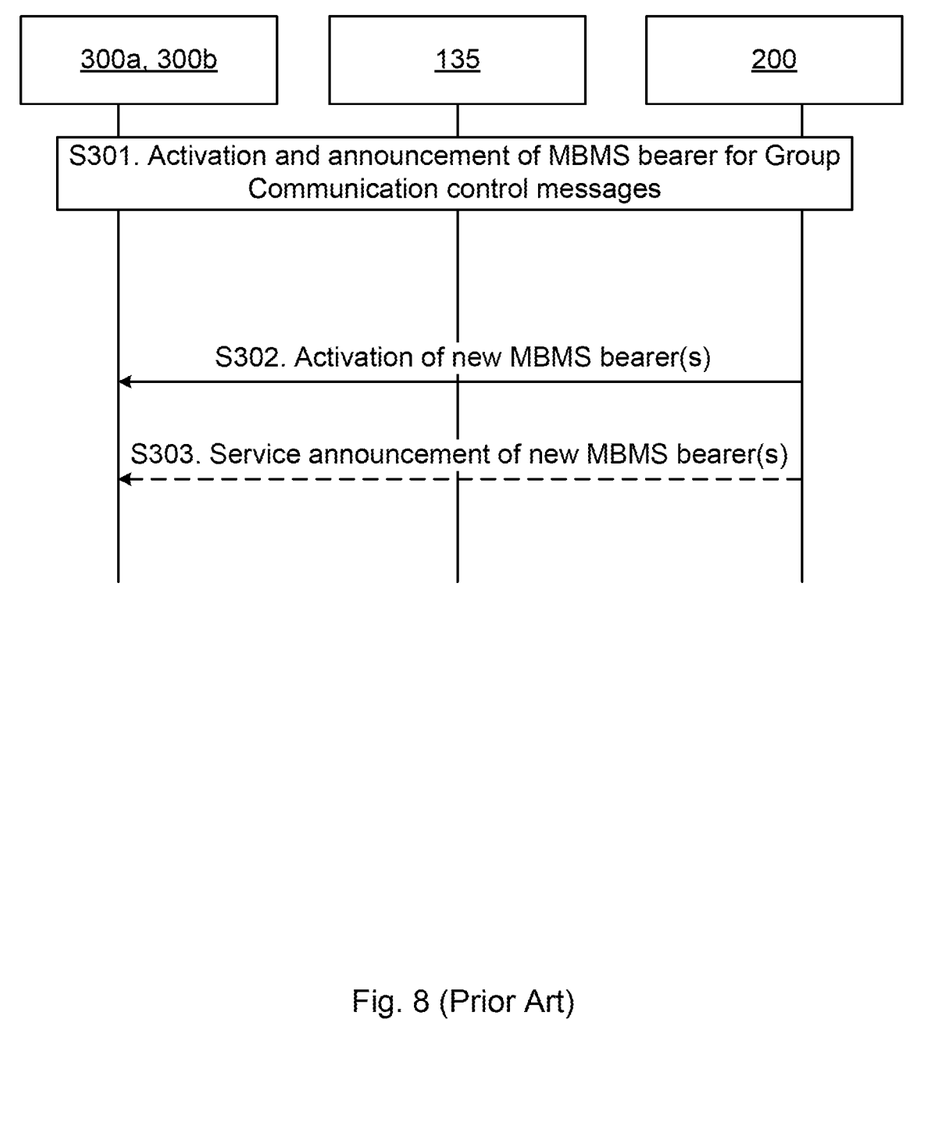
FIG. 8 is a signalling diagram according to prior art.

Reference is now made to the signalling diagram of FIG. 8 illustrating a method according to prior art for activating and announcing two (or more) MBMS bearers.

S301: One MBMS bearer is activated and announced to the client nodes 300a, 300b by the control node 200. This MBMS bearer can be used for group communication control messages such as floor control. The client nodes 300a, 300b in the wireless devices 150a, 150b are actively monitoring this group communication control messages channel.

Steps S302 and S303 are then repeated for each new MBMS bearer that needs to be activated and announced. Steps S302 and S303 may occur in any order.

S302: A new MBMS bearer is activated by the control node 200 based on a need for group communication. This new MBMS bearer can be used to broadcast the group communication data.

S303: An MBMS service for the new MBMS bearer is (optionally) announced to the client nodes 300a, 300b by the control node 200 according to any of the defined procedures for service announcement in 3GPP TS 26.346 v13.2.0. However the service may be inactive (if step S303 is performed before S302) as indicated by scheduling information in the service announcement information.

This is an issue in scenarios where there are a large number of wireless devices 150a, 150b in a small area, since it will lead to that a large number of wireless devices 150a, 150b are simultaneously switching to radio resource control connected mode when a new service announcement distributed to a large number of wireless devices 150a and 150b. This may drain the capacity of one or more radio access network nodes 120 in the radio access network 110. If service announcement is performed on a broadcast channel the wireless devices 150a, 150b are configured to receive updates repetitive based on a configured time interval. This service announcement also includes all services typically in large areas. This is not optimal for dynamic and real time service announcement requirements.

According to the embodiments disclosed herein there is proposed mechanisms that enable an optimized service announcement process that can be broadcasted over an MBMS bearer carrying a group communication service. The service announcement information can be sent in real time application protocol, such as the Real-Time Protocol (RTP), or its controlling protocol, the Real-time Transport Control Protocol (RTCP). The optimized service announcement information could be limited to the mandatory parts, and may optionally refer to an already announced service, which may include more complete information that applies also to the new service being announced.

The embodiments disclosed herein thus relate to mechanisms for MBMS bearer handling in a group communications system 100. In order to obtain such mechanisms there is provided a control node 200, a method performed by the control node 200, a computer program product comprising code, for example in the form of a computer program, that when run on processing circuitry of the control node 200, causes the control node 200 to perform the method. In order to obtain such mechanisms there is further provided a client node 300*a*, 300*b*, a method performed by the client node 300*a*, 300*b*, and a computer program product comprising code, for example in the form of a computer program, that when run on processing circuitry of the client node 300*a*, 300*b*, causes the client node 300*a*, 300*b* to perform the method.

Figure 5:
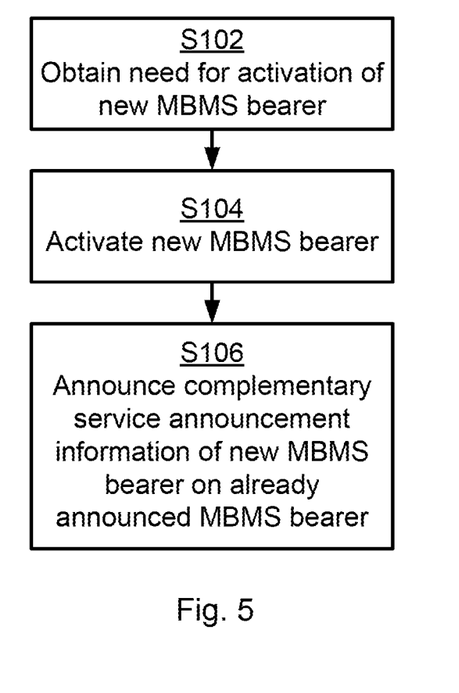
FIGS. 5, 6, and 7 are flowcharts of methods according to embodiments.
Figure 6:
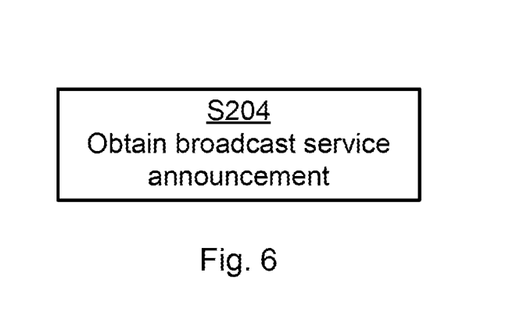
Figure 7:
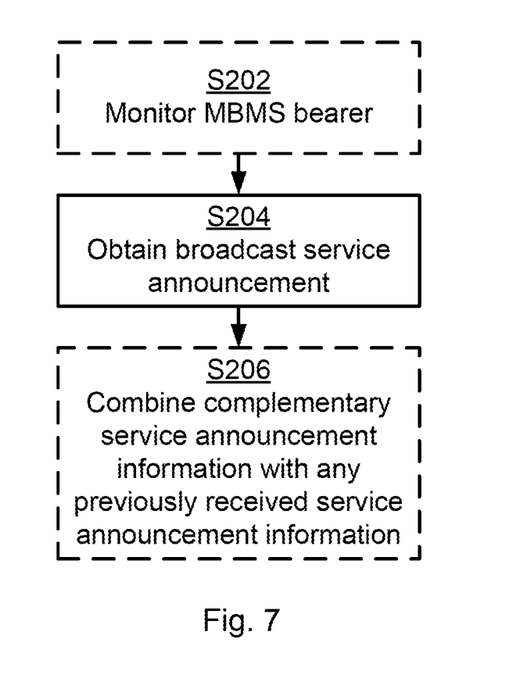

FIG. 5 is a flow chart illustrating an embodiment of a method for MBMS bearer handling in a group communications system 100 as performed by the control node 200. FIGS. 6 and 7 are flow charts illustrating embodiments of methods for MBMS bearer handling in a group communications system 100 as performed by the client node 300*a*, 300*b*. The methods are advantageously provided as computer programs 420*a*, 420*b*.

Reference is now made to FIG. 5 illustrating a method for MBMS bearer handling in a group communications system 100 as performed by the control node 200 according to an embodiment.

It is assumed that there is a need for a new MBMS bearer to be activated in the group communications system 100. The control node 200 is therefore configured to perform step S102:

S102: The control node 200 obtains a need for a new MBMS bearer to be activated.

The control node 200 then activates the new MBMS bearer. The control node 200 is thus configured to perform step S104:

S104: The control node 200 activates the new MBMS bearer.

The MBMS bearer handling in the group communications system 100 is based on making a service announcement of a new MBMS bearer on an already announced MBMS bearer, where the service announcement comprises complementary service announcement information. Hence, the control node 200 announces the new MBMS bearer according to step S106:

S106: The control node 200 announces MBMS bearer identity and complementary service announcement information of the new MBMS bearer on an already announced MBMS bearer. The new MBMS bearer is thereby announced.

This enables the control node 200 to quickly announce new services over a known MBMS bearer. It allows the client nodes 300*a*, 300*b* to stay in idle mode and still receive information of the new MBMS service. This allows rapid modification of MBMS capacity allocation to dynamically meet the current needs of the group communications system 100. It also avoids massive unicast transmissions of service announcements.

Embodiments relating to further details of MBMS bearer handling in the group communications system 100 relating to the control node 200 will now be disclosed.

There may be different purposes for activating the new MBMS bearer. According to some aspects the new MBMS bearer is activated for supporting media transmission in a group call of the group communications system 100.

There may be different ways to announce the new MBMS bearer. According to some aspects the MBMS bearer identity and complementary service announcement information is announced on demand and in direct response to the new MBMS bearer being activated. Hence, according to some aspects step S106 is performed in direct response to step S104.

Reference is now made to FIG. 6 illustrating a method for MBMS bearer handling in a group communications system 100 as performed by the client node 300*a*, 300*b* according to an embodiment.

As disclosed above the control node 200 in step S106 announces MBMS bearer identity and complementary service announcement information of the new MBMS bearer on an already announced MBMS bearer. It is here assumed that the client node 300*a*, 300*b* receives this announcement. Hence, the client node 300*a*, 300*b* is configured to perform step S204:

S204: The client node 300*a*, 300*b* obtains a broadcast service announcement of the new MBMS bearer on the already announced MBMS bearer from the control node 200 of the group communications system 100. The service announcement comprises the MBMS bearer identity and (mandatory and optional) complementary service announcement information of the new MBMS bearer.

Embodiments relating to further details of MBMS bearer handling in the group communications system 100 relating to the client node 300*a*, 300*b* will now be disclosed.

Reference is now made to FIG. 7 illustrating methods for MBMS bearer handling in the group communications system 100 as performed by the client node 300*a*, 300*b* according to further embodiments. It is assumed that step S204 is performed as disclosed above.

There may be different ways for the client node 300*a*, 300*b* to obtain the broadcast service announcement. According to some aspects the client node 300*a*, 300*b* monitors the already announced MBMS bearer. Hence, according to an embodiment the client node 300*a*, 300*b* is configured to perform step S202:

S202: The client node 300*a*, 300*b* monitors the already announced MBMS bearer upon obtaining the broadcast service announcement. Step S202 is performed prior to step S204.

The client node 300*a*, 300*b* is then allowed to be in idle mode when obtaining the broadcast service announcement in step S204.

There may be different ways for the client node 300*a*, 300*b* to handle the complementary information. For example, according to some aspects, the client node 300*a*, 300*b* combines the complementary information with any previously received service announcement information (if existing). Hence, according to an embodiment the client node 300*a*, 300*b* is configured to perform step S206:

S206: The client node 300*a*, 300*b* combines the complementary service announcement information with any previously received service announcement information of the new MBMS bearer. The combining generates complete service announcement information of the new MBMS bearer. Step S206 is performed after step S204. Here, the complementary service announcement information and the previously received service announcement information can both be regarded as defining partial service announcement information.

Embodiments which are applicable to the methods for MBMS bearer handling in the group communications system 100 as performed by both the control node 200 and the client node 300*a*, 300*b* will now be described in turn.

There can be different examples of the already announced MBMS bearer. According to some aspects the already announced MBMS bearer is used by the control node 200 for transmitting group communication control messages in the group communications system 100.

There can be different examples of how to announce the MBMS bearer identity and complementary service announcement information. According to some aspects the MBMS bearer identity and complementary service announcement information is announced using a Real-Time Protocol (RTP), or a Real-time Transport Control Protocol (RTCP).

There can be different examples of complementary service announcement information. According to an embodiment the complementary service announcement information comprises group communication streaming media initialization parameters of the new MBMS bearer. Here, the streaming media initialization parameters could comprise at least one of a multicast Internet Protocol, IP, address, User datagram protocol, UDP, port information, IP source address information of media source, media protocol information, codec information and reference to at least one other announced MBMS bearer. In this respect the thus listed parameters can be reused from previous announcements. According to an embodiment the complementary service announcement information comprises at least one reference to service announcement information of at least one previously announced MBMS bearer.

Figure 9:
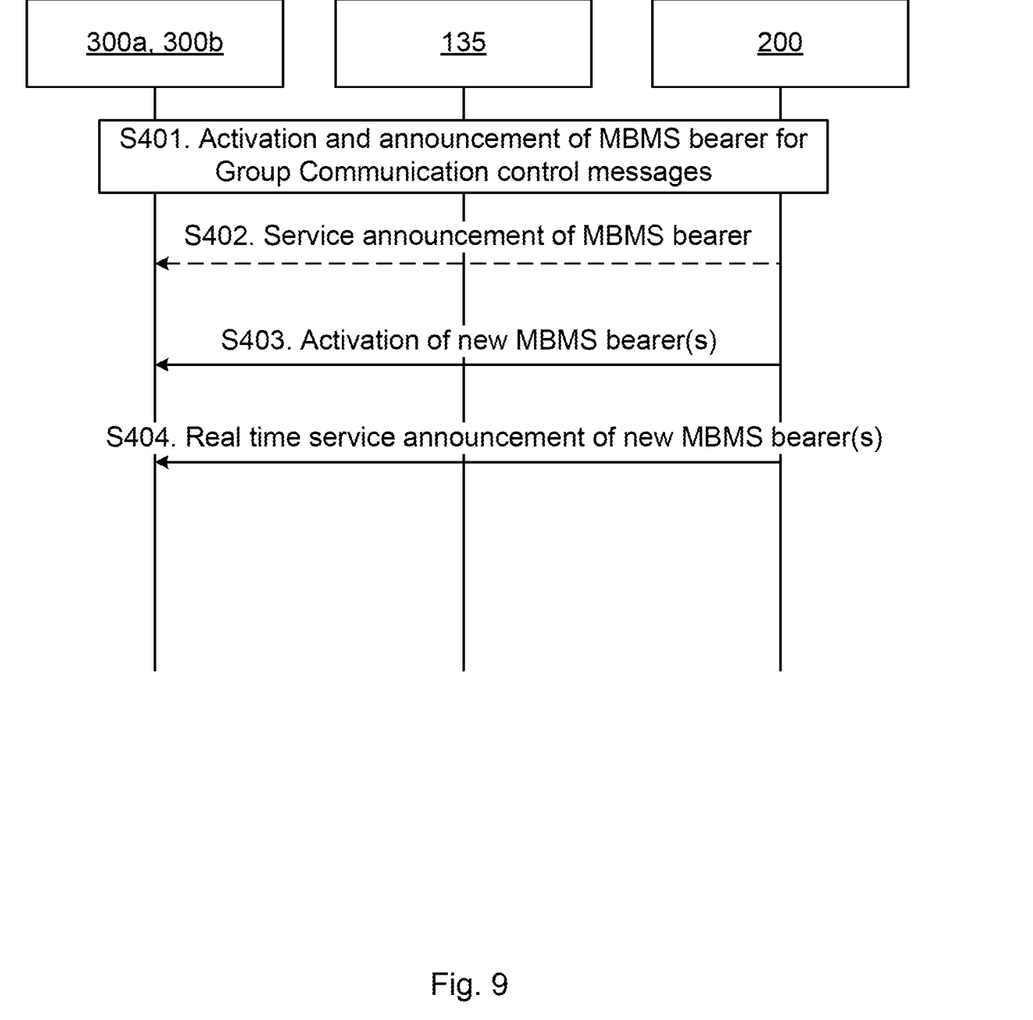
FIG. 9 is a signalling diagram according to an embodiment.

A particular embodiment for MBMS bearer handling in a group communications system 100 based on at least some of the above disclosed embodiments will now be disclosed in detail with reference to the signalling diagram of FIG. 9.

A pre-condition for this particular embodiment is a group communication system 100 comprising a group communication application server (GCS AS) as represented by the control node 200) and an MBMS system as represented by the BM-SC 135.

S401: One MBMS bearer is activated and announced to the client nodes 300a, 300b by the control node 200. This MBMS bearer can be used for group communication control messages such as floor control. The client nodes 300a, 300b in the wireless devices 150a, 150b are actively monitoring this group communication control messages channel. One way to implement step S401 is to perform step S202.

S402: An MBMS service is (optionally) announced to the client nodes 300a, 300b by the control node 200 according to any of the defined procedures for service announcement in 3GPP TS 26.346 v13.2.0. However the service may be inactive as indicated by scheduling information in the service announcement information.

S403: A new MBMS bearer is activated by the control node 200 based on a need for group communication. This new MBMS bearer can be used to broadcast the group communication data. One way to implement step S403 is to perform any of steps S102, S104.

S404: To announce the new MBMS bearer, the control node 200 sends a service announcement message to the BM-SC 135 in the MBMS system. The new MBMS bearer is thus announced on an already announced MBMS bearer. The service announcement message for the new MBMS bearer will be broadcasted over the radio access network 120 to the wireless devices 150a, 150b, and thus to the client nodes 300a, 300b. This message may be carried in a RTCP packet, and can thus be sent on demand, and contains at least the minimum required parameters for the client nodes 300a, 300b to be able to start monitoring the new MBMS bearer. This includes the MBMS bearer identity in the form of a Temporary Mobile Group Identity (TMGI), the Session Description Protocol (SDP) for the session and potentially additional parameters. The SDP includes a Multicast IP address, port, source address, protocol, codec. Additionally this message may include a reference to an already announced MBMS service. This would allow reuse of other type of features such as scheduling information, error correction procedures, reception reporting procedures etc. One way to implement step S404 is to perform step S106 and step S204.

Figure 2A:
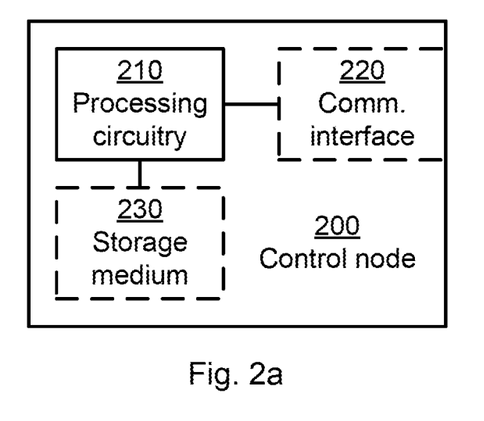
FIG. 2a is a schematic diagram showing functional units of a control node name according to an embodiment.

FIG. 2a schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, S102-S106, S403, S404, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The control node 200 may further comprise a communications interface 220 for communications at least with at least one client node 300a, 300b. As such the communications interface 220 may comprise one or more transmitters and receivers, comprising analogue and digital components and a suitable number of antennas for wireless communications and ports for wireline communications.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 2B:
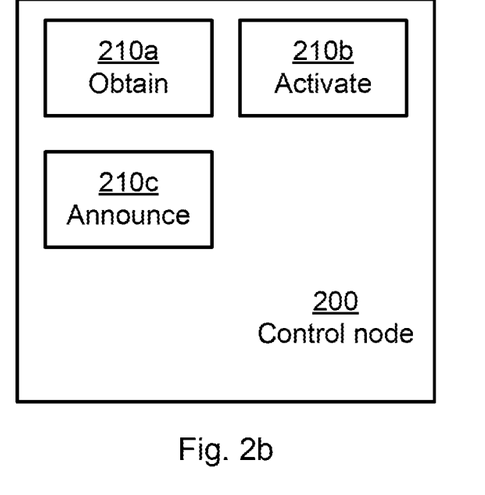
FIG. 2b is a schematic diagram showing functional modules of a control node name according to an embodiment.

FIG. 2b schematically illustrates, in terms of a number of functional modules, the components of a control node 200 according to an embodiment. The control node 200 of FIG. 2b comprises a number of functional modules; an obtain module 210a configured to perform step S102, an activate module 210b configured to perform step S104, and an announce module 210c configured to perform step S106. The control node 200 of FIG. 2b may further comprise at least one optional functional module. In general terms, each functional module 210a-210c may be implemented in hardware or in software. Preferably, one or more or all functional modules 210a-210c may be implemented by the processing circuitry 210, possibly in cooperation with functional units 220 and/or 230. The processing circuitry 210 may thus be arranged to from the storage medium 230 fetch instructions as provided by a functional module 210a-210c and to execute these instructions, thereby performing steps S102-S106, S403, S404.

The control node 200 may be provided as a standalone device or as a part of at least one further device. For example, the control node 200 may be provided in a node of the radio access network 120 or in a node of the core network 130 or in a node of the service network 140. Alternatively, functionality of the control node 200 may be distributed between at least two devices, or nodes. These at least two nodes, or devices, may either be part of the same network part (such as the radio access network or the core network or the service network) or may be spread between at least two such network parts. Some examples of where in the communications system 100 the control node 200 may be provided are illustrated in FIG. 1.

Functionality of the control node 200 may be implemented at the service layer of the protocol stack. In general terms, instructions that are required to be performed in real time may be performed in a device, or node, operatively closer to the radio access network 120 than instructions that are not required to be performed in real time. In this respect, at least part of the control node 200 may reside in the radio access network 120, such as in the radio access network node 110, for cases when embodiments as disclosed herein are performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210c of FIG. 2b and the computer program 420a of FIG. 4 (see below).

Figure 3A:
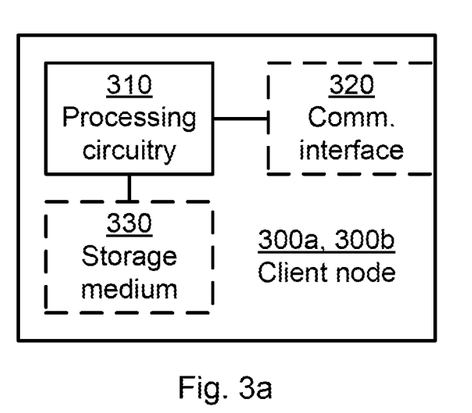
FIG. 3a is a schematic diagram showing functional units of a client node according to an embodiment.

FIG. 3a schematically illustrates, in terms of a number of functional units, the components of a client node 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the client node 300a, 300b to perform a set of operations, or steps, S202-S206, S401, S404, as disclosed above. For example, the storage medium 330 may store the set of operations, and the processing circuitry 310 may be configured to retrieve the set of operations from the storage medium 330 to cause the client node 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The client node 300a, 300b may further comprise a communications interface 320 for communications at least with a control node 200. As such the communications interface 320 may comprise one or more transmitters and receivers, comprising analogue and digital components and a suitable number of antennas for wireless communications and ports for wireline communications.

The processing circuitry 310 controls the general operation of the client node 300a, 300b e.g. by sending data and control signals to the communications interface 320 and the storage medium 330, by receiving data and reports from the communications interface 320, and by retrieving data and instructions from the storage medium 330. Other components, as well as the related functionality, of the client node 300a, 300b are omitted in order not to obscure the concepts presented herein.

Figure 3B:
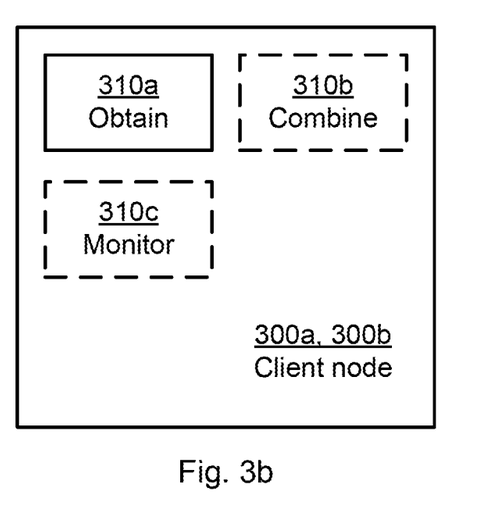
FIG. 3b is a schematic diagram showing functional modules of a client node according to an embodiment.

FIG. 3b schematically illustrates, in terms of a number of functional modules, the components of a client node 300a, 300b according to an embodiment. The client node 300a, 300b of FIG. 3b comprises an obtain module 310a configured to perform step S204. The client node 300a, 300b of FIG. 3b may further comprise a number of optional functional modules, such as any of a combine module 310b configured to perform step S206, and a monitor module 310c configured to perform step S202. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing steps S202-S206, S401, S404.

The client node 300a, 300b may be provided as a standalone device or as a part of at least one further device. For example, the client node 300a, 300b may be provided in a wireless device 150a, 150b. Hence, any processing circuitry, communications interface and storage medium of the wireless device 150a, 150b may be shared with the processing circuitry 310, communications interface 320 and storage medium 330 of the client node 300a, 300b. It is thus not necessary for the client node 300a, 300b to have its own processing circuitry 310, communications interface 320 and storage medium 330 as long as the processing circuitry, communications interface and storage medium of the wireless device 150a, 150b is configured to implement the functionality of the herein disclosed client node 300a, 300b.

Figure 4:
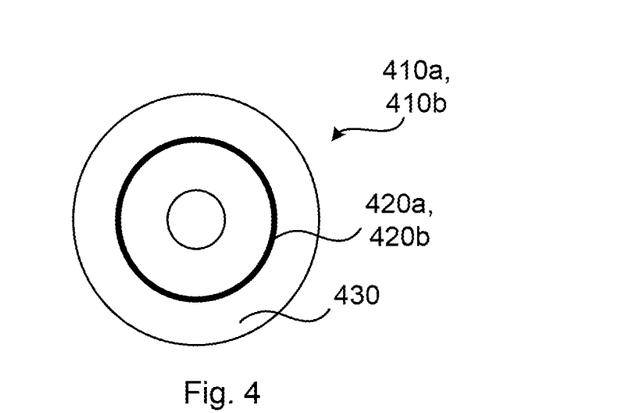
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the control node 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the client node 300a, 300b as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for multimedia broadcast multicast service (MBMS) bearer handling in a group communications system, the method being performed by a control node, the method comprising:
    obtaining a need for a new MBMS bearer to be activated;
    activating the new MBMS bearer; and
    announcing MBMS bearer identity and complementary service announcement information of the new MBMS bearer on an already announced MBMS bearer, thereby announcing the new MBMS bearer.

2. The method according to claim 1, wherein the new MBMS bearer is activated for supporting media transmission in a group call of the group communications system.

3. The method according to claim 1, wherein the MBMS bearer identity and complementary service announcement information is announced on demand and in direct response to the new MBMS bearer being activated.

4. A method for multimedia broadcast multicast service (MBMS) bearer handling in a group communications system, the method being performed by a client node, the method comprising:
    obtaining a broadcast service announcement of a new MBMS bearer on an already announced MBMS bearer from a control node of the group communications system,
    wherein the service announcement comprises the MBMS bearer identity and complementary service announcement information of the new MBMS bearer.

5. The method according to claim 4, further comprising:
    combining the complementary service announcement information with any previously received service announcement information of the new MBMS bearer so as to generate complete service announcement information of the new MBMS bearer.

6. The method according to claim 4, further comprising:
    monitoring the already announced MBMS bearer upon obtaining the broadcast service announcement.

7. The method according to claim 4, wherein the client node is in idle mode when obtaining the broadcast service announcement.

8. The method according to claim 4, wherein the already announced MBMS bearer is used by the control node for transmitting group communication control messages in the group communications system.

9. The method according to claim 4, wherein the MBMS bearer identity and complementary service announcement information is announced using a Real-Time Protocol, RTP, or a Real-time Transport Control Protocol, RTCP.

10. The method according to claim 4, wherein the complementary service announcement information comprises group communication streaming media initialization parameters of the new MBMS bearer.

11. The method according to claim 10, wherein the streaming media initialization parameters comprises at least one of a multicast Internet Protocol, IP, address, User datagram protocol, UDP, port information, IP source address information of media source, media protocol information, codec information, and reference to at least one other announced MBMS bearer.

12. The method according to claim 4, wherein the complementary service announcement information comprises at least one reference to service announcement information of at least one previously announced MBMS bearer.

13. A control node for multimedia broadcast multicast service (MBMS) bearer handling in a group communications system, the control node comprising processing circuitry, the processing circuitry being configured to cause the control node to:
    obtain a need for a new MBMS bearer to be activated;
    activate the new MBMS bearer; and
    announce MBMS bearer identity and complementary service announcement information of the new MBMS bearer on an already announced MBMS bearer, thereby announcing the new MBMS bearer.

14. A control node for multimedia broadcast multicast service (MBMS) bearer handling in a group communications system, the control node comprising:
    processing circuitry; and
    a computer program product (410a) storing instructions that, when executed by the processing circuitry, causes the control node to:
        obtain a need for a new MBMS bearer to be activated;
        activate the new MBMS bearer; and
        announce MBMS bearer identity and complementary service announcement information of the new MBMS bearer on an already announced MBMS bearer, thereby announcing the new MBMS bearer.

15. A client node for multimedia broadcast multicast service (MBMS) bearer handling in a group communications system, the client node comprising processing circuitry, the processing circuitry being configured to cause the client node to:
    obtain a broadcast service announcement of a new MBMS bearer on an already announced MBMS bearer from a control node of the group communications system,
    wherein the service announcement comprises the MBMS bearer identity and complementary service announcement information of the new MBMS bearer.

16. A client node for multimedia broadcast multicast service (MBMS) bearer handling in a group communications system, the client node comprising:
    processing circuitry; and
    a computer program product storing instructions that, when executed by the processing circuitry, causes the client node to:

obtain a broadcast service announcement of a new MBMS bearer on an already announced MBMS bearer from a control node of the group communications system, wherein the service announcement comprises the MBMS bearer identity and complementary service announcement information of the new MBMS bearer.

\* \* \* \* \*